United States Patent [19]

Seo

[11] Patent Number: 6,046,975
[45] Date of Patent: Apr. 4, 2000

[54] CLUMPING MECHANISM FOR SECURELY HOLDING A DISC IN AN OPTICAL DISK PLAYER

[75] Inventor: Young-sun Seo, Seongnam, Rep. of Korea

[73] Assignee: Samsung Electronics Co., Ltd., Kyungki-do, Rep. of Korea

[21] Appl. No.: 08/747,964

[22] Filed: Nov. 12, 1996

[30] Foreign Application Priority Data

Apr. 23, 1996 [KR] Rep. of Korea ...................... 96-12408

[51] Int. Cl.$^7$ ............................. G11B 23/00; G11B 33/02
[52] U.S. Cl. .......................................... 369/270; 369/77.1
[58] Field of Search .................................... 369/270, 271, 369/75.2, 77.2, 77.1, 75.1; 360/97.01, 99.03, 98.06, 98.04, 99.12, 99.05

[56] References Cited

U.S. PATENT DOCUMENTS

| 3,940,796 | 2/1976 | Haun et al. ............................... 360/109 |
| 4,139,876 | 2/1979 | Owens ....................................... 360/97 |
| 4,466,033 | 8/1984 | Jordan et al. ............................... 360/99 |
| 4,513,409 | 4/1985 | Staar ....................................... 369/77.1 |
| 4,602,306 | 7/1986 | Noda ......................................... 360/99 |
| 4,621,295 | 11/1986 | Okamura .................................... 360/99 |
| 4,674,077 | 6/1987 | Yoshimoto et al. ........................ 369/37 |
| 4,701,900 | 10/1987 | Hasegawa et al. ......................... 369/36 |
| 4,740,937 | 4/1988 | Watanabe .................................. 369/13 |
| 4,763,213 | 8/1988 | Muroyama .............................. 360/105 |
| 4,786,997 | 11/1988 | Funabashi et al. ........................ 360/97 |
| 5,016,236 | 5/1991 | Cho ........................................ 369/75.2 |
| 5,060,096 | 10/1991 | Hirose et al. .......................... 360/99.12 |
| 5,119,357 | 6/1992 | Tsuruta et al. .......................... 369/75.2 |
| 5,187,700 | 2/1993 | Yoon ..................................... 369/75.1 |
| 5,299,185 | 3/1994 | Sakurai et al. ......................... 360/75.2 |
| 5,467,338 | 11/1995 | Song ....................................... 369/270 |
| 5,583,717 | 12/1996 | Nakata et al. ....................... 360/99.06 |

FOREIGN PATENT DOCUMENTS

| 0128331 | 12/1984 | European Pat. Off. . |
| 6-111444 | 4/1994 | Japan . |
| 6-333311 | 12/1994 | Japan . |

Primary Examiner—Stuart S. Levy
Assistant Examiner—Kenneth W Fields
Attorney, Agent, or Firm—Sughrue, Mion, Zinn, Macpeak & Seas, PLLC.

[57] ABSTRACT

An optical includes a tray on which an optical disc is placed, a mechanism for driving the tray, a clamp for pressing the optical disc, and a housing for housing the tray therein. A clamp lever is pivotally hinged on the tray in order to retain the clamping and an elastic member for pressing the clamp is fixed to an opposite end of the clamp lever.

7 Claims, 8 Drawing Sheets

6,046,975

CLUMPING MECHANISM FOR SECURELY HOLDING A DISC IN AN OPTICAL DISK PLAYER

BACKGROUND OF THE INVENTION

1. Field of the Invention

The present invention relates to an optical disc player, and more particularly, to an optical disc player having a clamp lever installed on a tray in order to prevent the position of an optical disc from deviating.

2. Description of the Related Art

An optical disc player employs an optical disc as a recording medium and reads data recorded on the optical disc, such as a compact disc, a laser disc, or a digital video disc, using a known type of optical pick-up device. The optical disc player is widely used as an auxiliary memory for a computer and for audio and video disc players.

FIG. 1A is a plan view of a conventional optical disc player and FIG. 1B schematically shows a left side view of FIG. 1A. FIG. 2 is a sectional view taken along line II—II of FIG. 1A. A tray 13 is movably installed on a deck 11, and an optical disc D is settled on a predetermined position of the tray 13. The dotted line not indicated by a reference numeral in FIG. 1 represents a tray position during unloading, and the solid line indicated by reference numeral 13 represents a tray position during loading. A user can exchange the optical discs D on the tray 13 during unloading at the position indicated by the dotted line. One side of a bottom surface of the tray 13 is provided with a rack 16, which engages a pinion 17 of a loading motor 18 installed on one side of the deck 11, to thereby move the tray 13 between the two illustrated positions.

The deck 11 is pivotally installed centering around a hinge 12 (FIG. 2). A spindle motor 19 installed under the deck 11 rotates a turntable 21. A disc catcher bracket 14 is transversely installed over the tray 13, and a disc clamp 15 is installed in the center of the disc catcher bracket 14. An optical pick-up 20 is located under the deck 11 and is movably installed along a rail 18, to thereby read optical data from the optical disc D in a known manner. The optical pick-up 20 can be reciprocated by driving means (not shown).

In the conventional optical disc player 10, the optical disc D, when rotating, is fixed to the turntable 21 by the disc clamp 15 installed on the disc catcher bracket 14. The bottom surface of the optical disc D in a loading position contacts with the turntable 21, and the upper surface thereof contacts with the clamp 15. Here, the turntable 21 and the clamp 15 are attracted to each other by a magnetic force or an elastic biasing force, so that the optical disc D placed therebetween can be stably rotated according to the rotation of the turntable 21.

However, in the conventional optical disc player 10, there is no mechanism for fixing the optical disc D on the tray when the tray is at the unloading position. Accordingly, when the optical disc player 10 is not arranged in a horizontal orientation, the optical disc D deviates or falls from the tray, so that the optical disc D cannot be loaded or unloaded in a reliable manner. Also, the disc catcher bracket 14 is installed transversely to the tray 13 as a separate part. Since a space occupied by the disk catcher bracket 14 in the player 10 is considerably wide, it is impossible to miniaturize the player. Furthermore, since the clamp 15 cannot completely clamp the optical disc D to the turntable 21, the optical disc D does not always rotate stably.

SUMMARY OF THE INVENTION

Accordingly, it is an object of the present invention to provide an optical disc player capable of effectively clamping an optical disc to a turntable.

It is another object to provide an optical disc player capable of clamping the optical disc to a turntable regardless of the orientation of the optical disc player.

It is still another object to provide an optical disc player where clamping means for pressing the optical disc is placed on a tray.

It is yet another object to provide an optical disc player that is easily miniaturized.

It is still yet another object to provide an optical disc player having an elastically pressed clamp.

To achieve these objects, there is provided an optical record reproduction apparatus having a tray on which an optical disc is placed, means for driving the tray, clamping means for pressing the optical disc, and a housing for housing the tray therein, including a clamp lever pivotally hinged on the tray at one end thereof in order to retain the clamping means, and an elastic member, for pressing the clamping means, fixed to an opposite end of the clamp lever.

Preferably, the optical disc player includes a shaft having a circular section and a protrusion protruding therefrom and integrally formed with the one end of the clamp lever, and an elastic plate member fixed on the tray and having a bending portion for interlocking with the protrusion of the shaft in order to transpose the clamp lever between two positions.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1A:
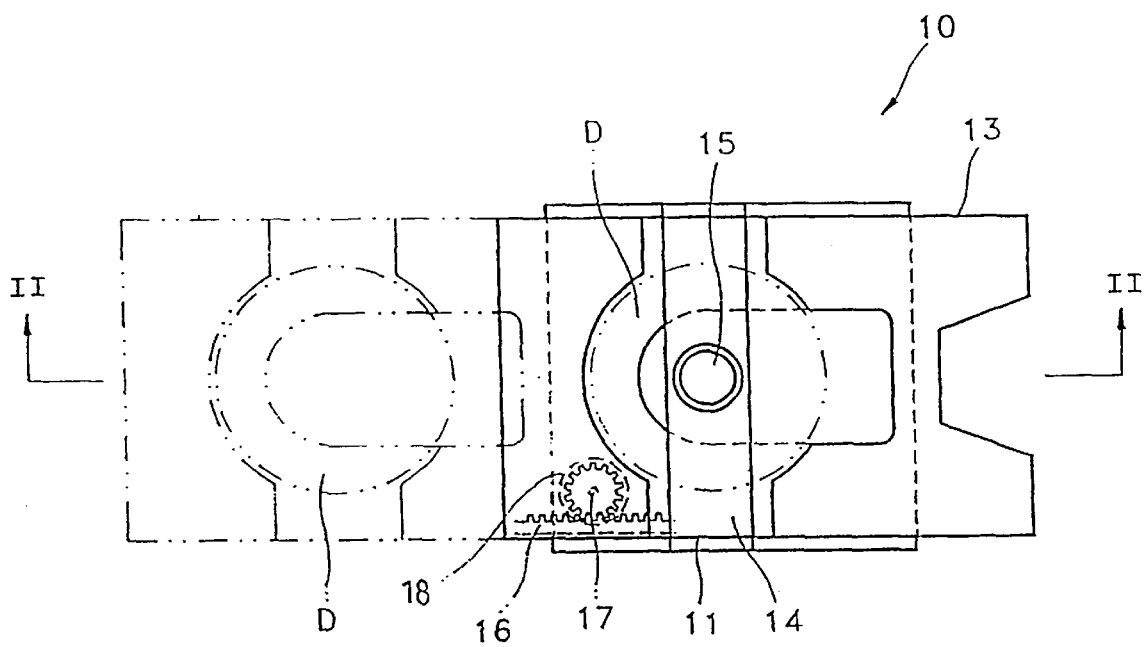
FIGS. 1A and 1B respectively are plan and side views of a conventional optical disc player.
Figure 1B:
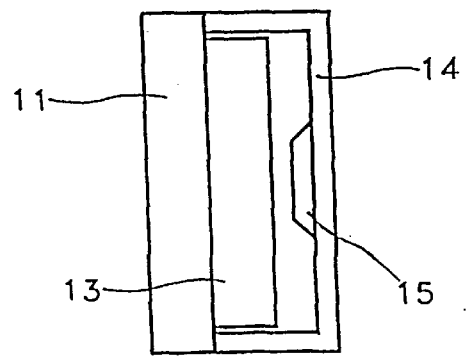
Figure 2:
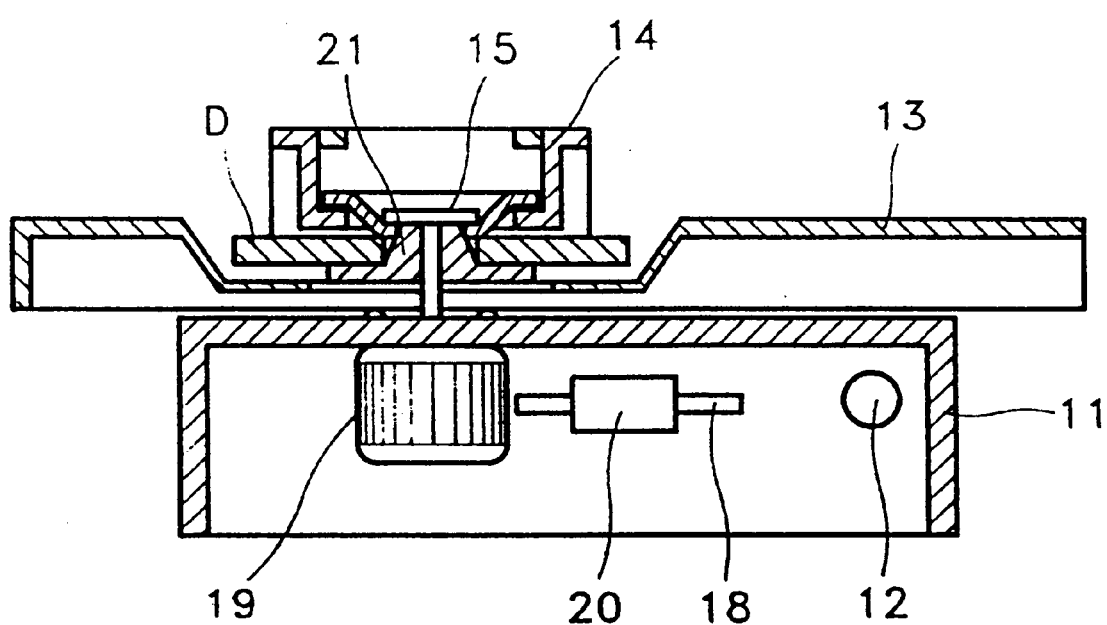
FIG. 2 is a sectional view taken along line II—II of FIG. 1A.
Figure 3:
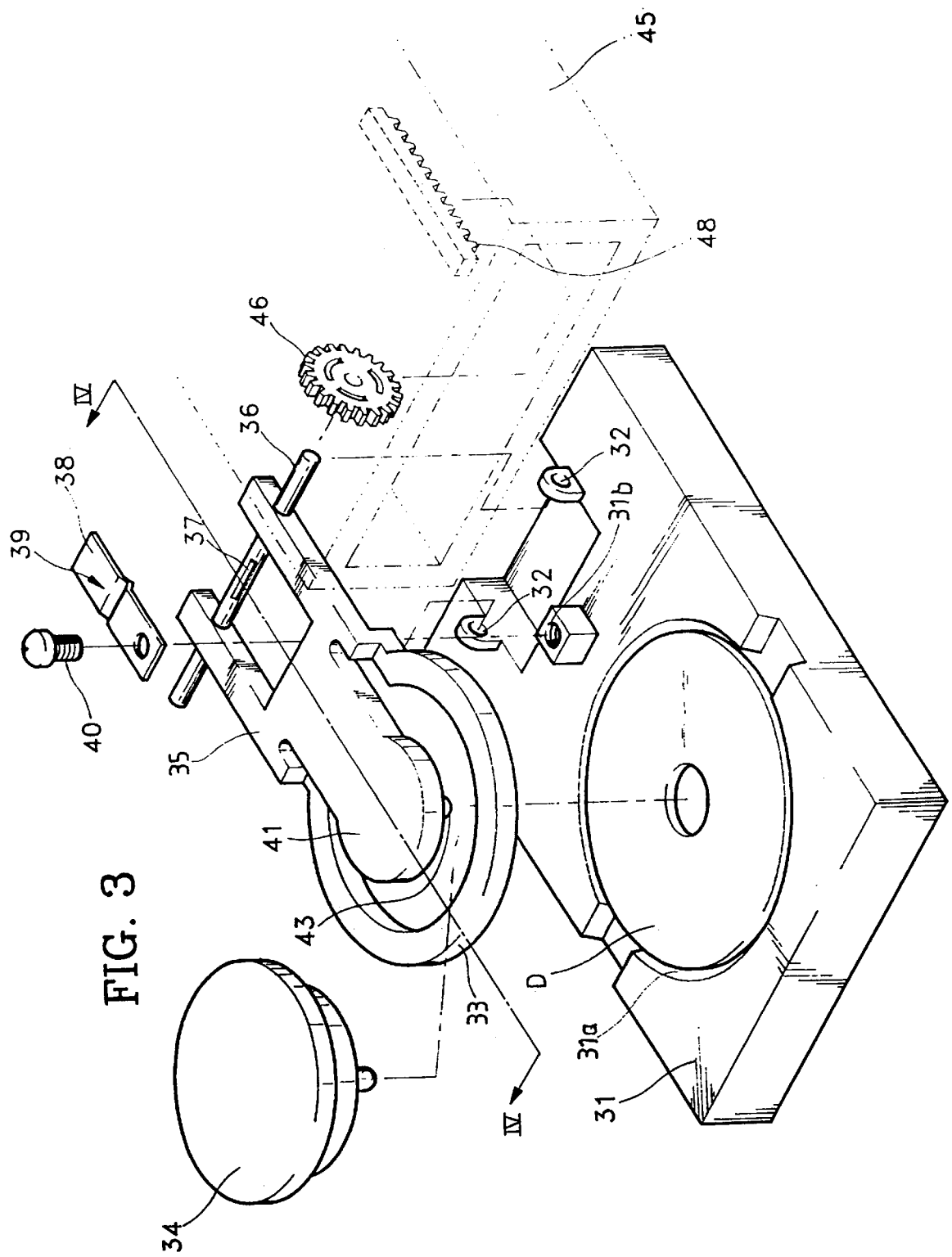
FIG. 3 is an exploded view of an optical disc player according to an embodiment of the present invention.

As illustrated in FIG. 3, an optical disc D is placed on an optical disc receiving portion 31a formed on a tray 31. The tray 31 is loaded into a housing 45 represented by a dotted line and unloaded by being moved towards the outside of the housing 45.

A clamp lever 35 is hinged to the tray 31. A shaft 36 is fixed to one end of the clamp lever 35, and both ends of the shaft 36 are rotatably supported by bearings 32 fixed to the tray 31. A clamp 34 is retained by an annular support 33 formed on the free end of the clamp lever 35. The connection between the clamp 34 and the clamp lever 35 can clearly be understood from FIG. 4A. When the optical disc D is loaded in the disc receiving portion 31a, the clamp 34 presses the center portion of the optical disc D to the tray 31.

The shaft 36 (FIG. 3) is circular in cross section and is provided with a protrusion 37 on a circumferential surface thereof. A screw 40 is received in threaded hole 31b on the tray 31. A bent portion 39 is formed on the leaf spring 38. The bent portion 39 of the leaf spring 38 is interlocked with the protrusion 37 of the shaft 36, to thereby secure the clamp lever 35 in one of two positions.

Figure 4A:
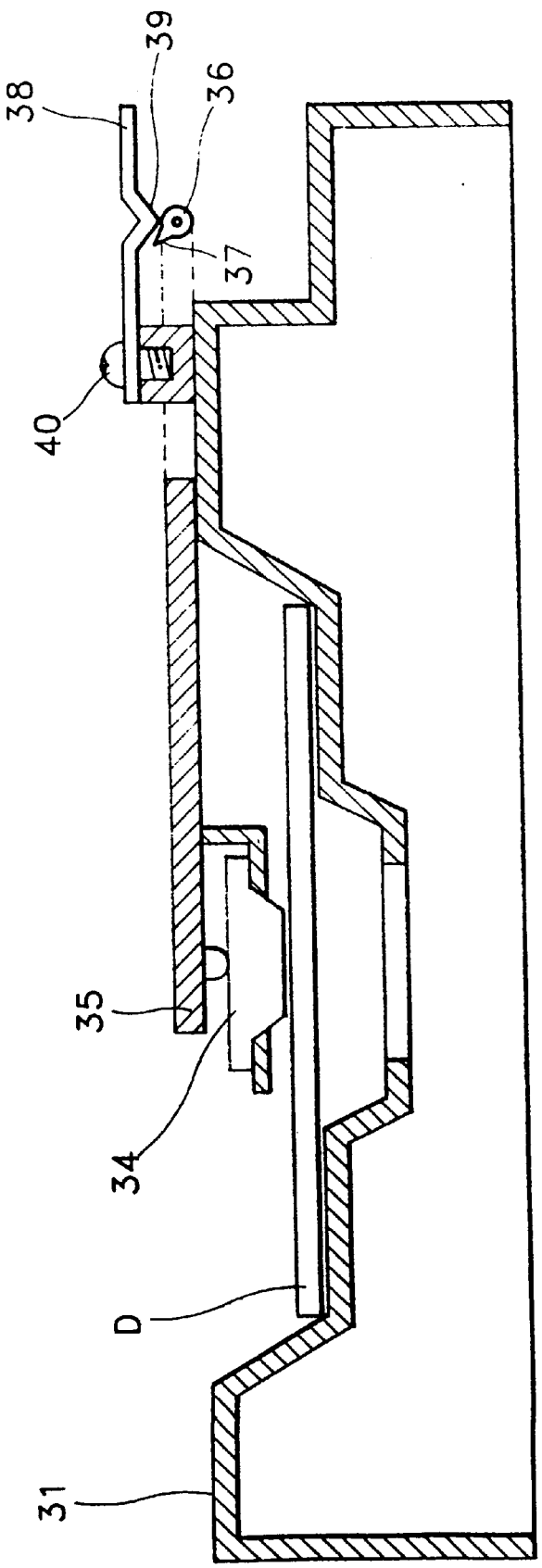
FIGS. 4A and 4B are sectional views taken along line IV—IV showing a tray of the optical disc player shown in FIG. 3.
Figure 4B:
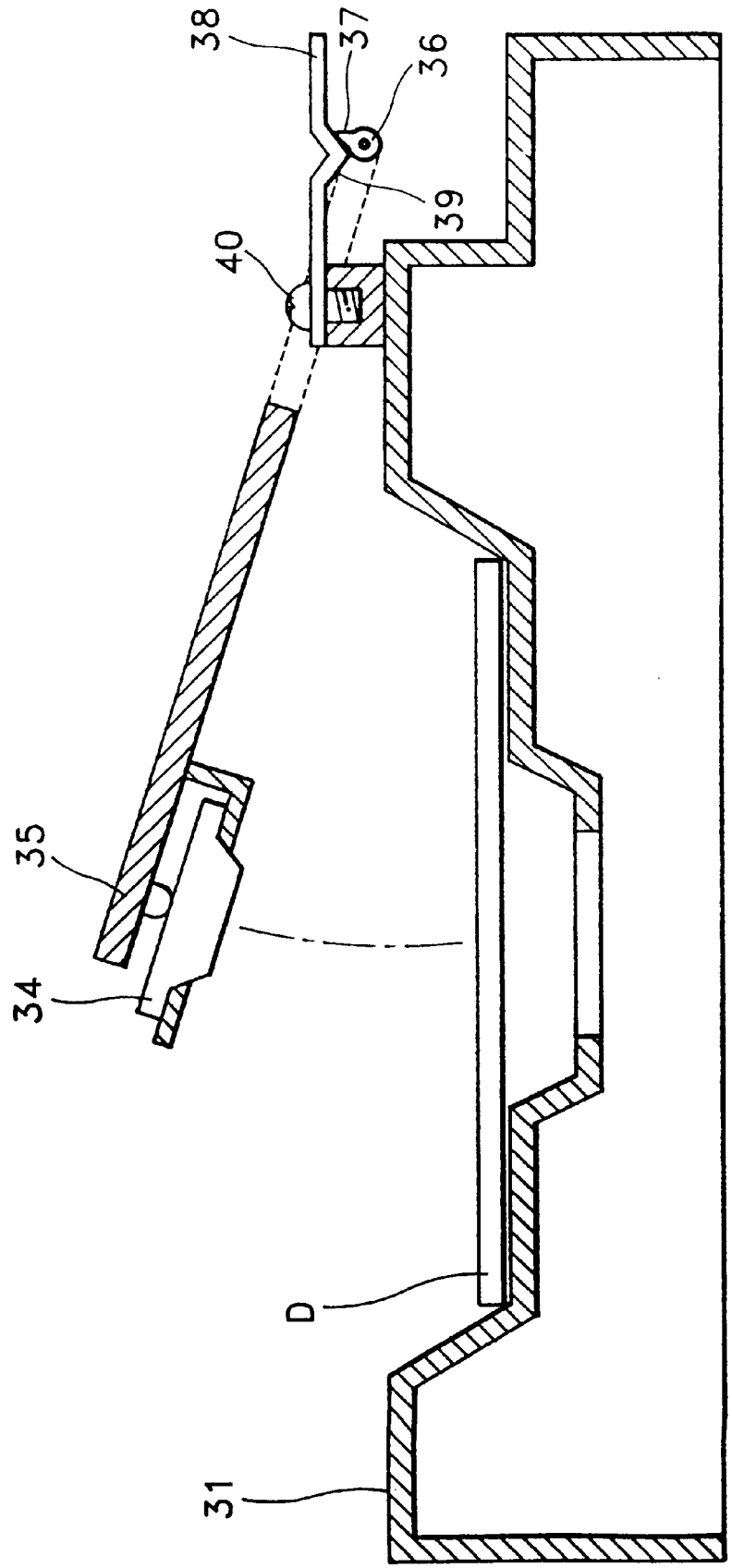

The movement of the clamp lever 35 is more easily comprehended from FIGS. 4A and 4B which are sectional views showing the movement of the clamp lever 35.

In FIG. 4A, the clamp lever 35 is in a horizontal position parallel to the tray 31 and the clamp 34 presses on the optical disc D. In this state, the protrusion 37 formed on the shaft 36 of the clamp lever 35 is interlocked with the bent portion 39 of the leaf spring 38, to thereby keep the clamp lever 35 closely in contact with the tray 31.

FIG. 4B shows the clamp lever 35 when it is inclined with respect to the tray 31 after being rotated clockwise. As shown in FIG. 4B, if the clamp lever 35 rotates from the horizontal position to the lifted position, the bending portion 39 of the leaf spring 38 exerts elastic resistance to the protrusion 37. Accordingly, only when external force sufficient to overcome such elastic resistance is exerted, can the clamp lever 35 be moved from a position shown in FIG. 4A to a position shown in FIG. 4B. Once the clamp lever 35 reaches the inclined position shown in FIG. 4B, the position of the clamp lever 35 is maintained due to interlocking state of the protrusion 43 and the bending portion 39.

Referring to FIG. 3, a clamp spring 41 is integrally formed with the clamp lever 35, to thereby press the clamp 34 through the elasticity of material used to form the clamp spring 41. A protrusion 43 is formed on the center portion of the clamp spring 41. When the optical disc D rotates due to the rotating force of the spindle motor (not shown), the clamp 34, in contact with the upper surface of the optical disc D, also rotates. The protrusion 43 and the rotating center of the clamp 34 coincide with each other. The protrusion 43 contacts the upper surface of the clamp 34 at a point to thereby generate pressure in a stable manner to keep the clamp 34 in contact with the optical disc D.

A pinion 46 is fixed to shaft 36 of the clamp lever 35. The pinion 46 is engaged with a rack 48 fixed to the inside of the housing 45. When the tray 31 enters the inside of the housing 45 during loading, the pinion 46 rotates counterclockwise due to engagement with the stationery rack 48 to thereby rotate the shaft 36 counterclockwise. That is, force generated from the rotation of the pinion 46 is transferred to the shaft 36, to thereby move the clamp lever 35 and the clamp 34 toward the upper surface of the optical disc D to assume the state of FIG. 4A. Meanwhile, when the tray 31 moves out of the housing 45 during unloading, the pinion 46 rotates clockwise and force generated from the rotation of the pinion 46 is not transferred to the shaft 36. That is, the clamping lever 35 during unloading is not automatically lifted from the tray 31. This function can be understood by referring to a structure of the pinion 46 shown in FIG. 5.

Figure 5:
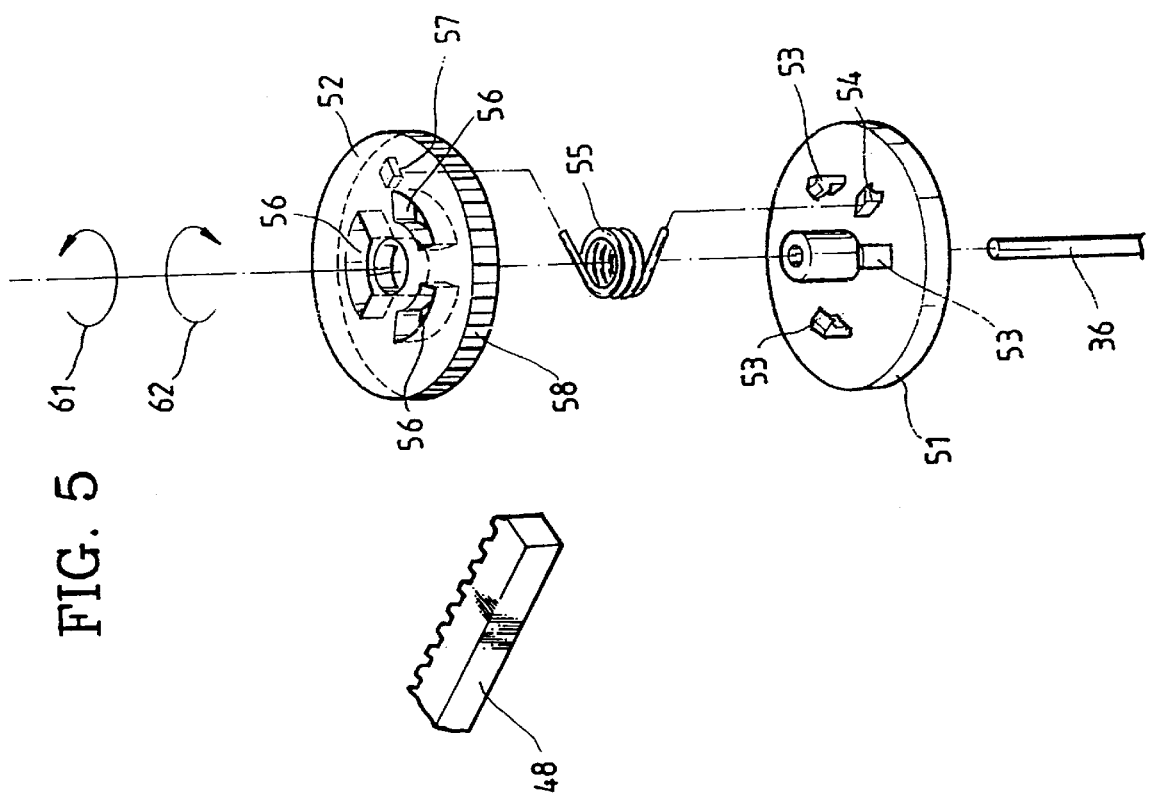
FIG. 5 is an exploded view of a rack and a pinion of the optical disc player according to the preferred embodiment.

FIG. 5 is an exploded perspective view of a pinion 46. The pinion 46 includes a disc 51 fixed to the shaft 36, and a gear member 52 rotatably connected to a central shaft of the disc 51. On surface of the disc 51 are connecting protrusions 53 which are symmetric with respect to the center of the disc 51. A first spring support 54 is also formed on the surface of the disc 51. Connecting through holes 56, corresponding to the connecting protrusions 53, are formed in the gear portion 52 and gear surface 58 is formed on a circumference of the gear member 52. A second spring support 57 is formed on a lower surface of the gear member 52 facing the disc 51. The connecting protrusions 53 are inserted into the connecting through holes 56, respectively. The formation angle of each connecting holes 56 is determined such that the connecting protrusion 53 can be rotated within a predetermined angle when the disc 51 and the gear member 52, which are connected with each other, rotate relative to each other. Ends of a coil spring 55 are supported by the first spring support 54 and the second spring support 57 respectively. Accordingly, the disc 51 and the gear member 52 are biased by the elastic force by the coil spring 55 in opposite directions.

As described above, the gear member 52 of the pinion 46, during loading, rotates counterclockwise, which corresponds to a direction indicated by reference numeral 61. Since the side surface of the connecting through holes 56 formed in the gear member 52 applies the rotating force to the connecting protrusions 53, the disc 51 also rotates counterclockwise. Even though the shaft 36 is pressed by the elastic force of the leaf spring 38, the external force transmitted to the shaft 36 through the connecting protrusions 53 can overcome the elasticity of the leaf spring 38 to thereby rotate the shaft 36.

On the contrary, the gear member 52 of the pinion 46, during unloading, rotates clockwise, which corresponds to a direction indicated by reference numeral 62 of FIG. 5. The second spring support 57 presses the coil spring 55 supported with respect to the first spring support 54 of the disc 51.

As described above, since the shaft 36 is pressed by the elastic force of the leaf spring 38 as shown in FIGS. 4A and 4B, the force for pressing the coil spring 55 is absorbed by elastic deformation of the spring itself but does not rotate the shaft 36. Accordingly, even though the gear member 52, engaging the rack 48, rotates during unloading, the shaft 36 and the clamp lever 35 do not rotate.

Figure 6B:
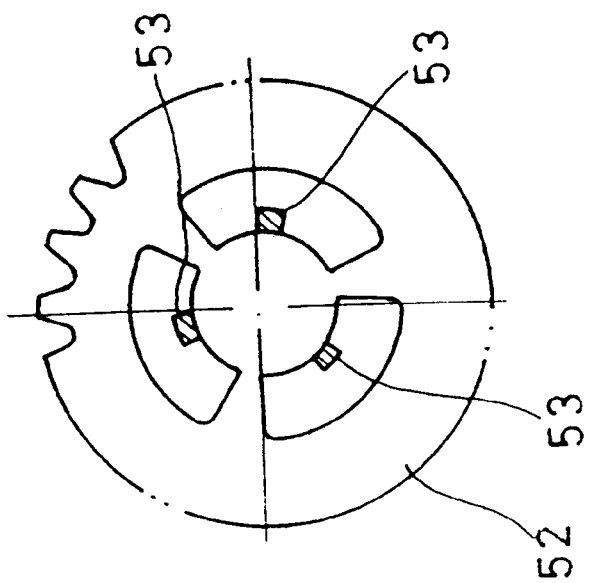
FIGS. 6A and 6B are views illustrating the pinion of FIG. 5.
Figure 6A:
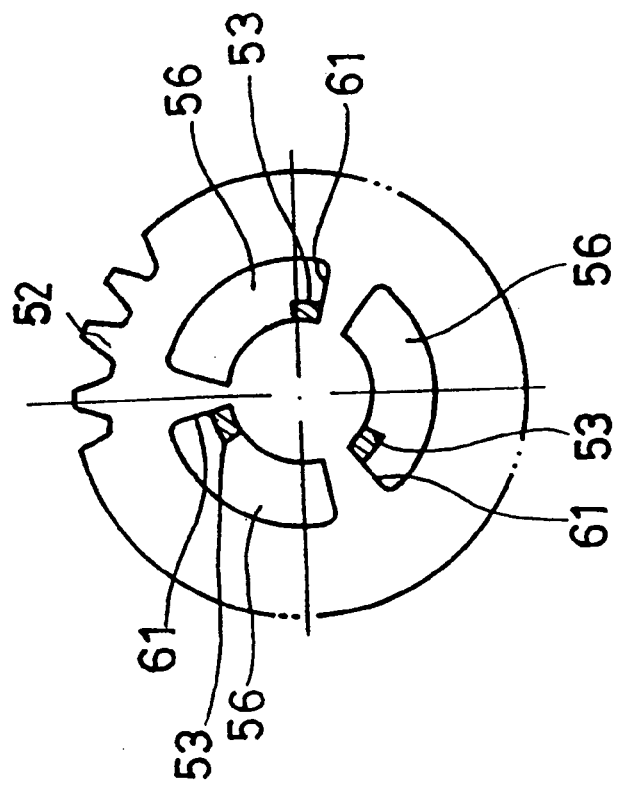

FIGS. 6A and 6B are plan views further illustrating the operation of the pinion 46. As shown in FIG. 6A, the connecting protrusions 53 inserted into the connecting holes 56 formed in the gear member 52 are in contact with a contact surfaces 61 when no external force is applied. When the gear member 52 rotates clockwise, the coil spring 55 of FIG. 5 is elastically deformed so that the connecting protrusions 53 are maintained in an initial position, which is shown FIG. 6B. However, when the gear member 52 rotates counterclockwise, the contact surfaces 61 of the connecting through holes 56 formed on the gear member 52 applies a direct rotating force to the connecting protrusion 53 to thereby rotate the disc 51 of FIG. 5 in a counterclockwise direction.

Figure 7:
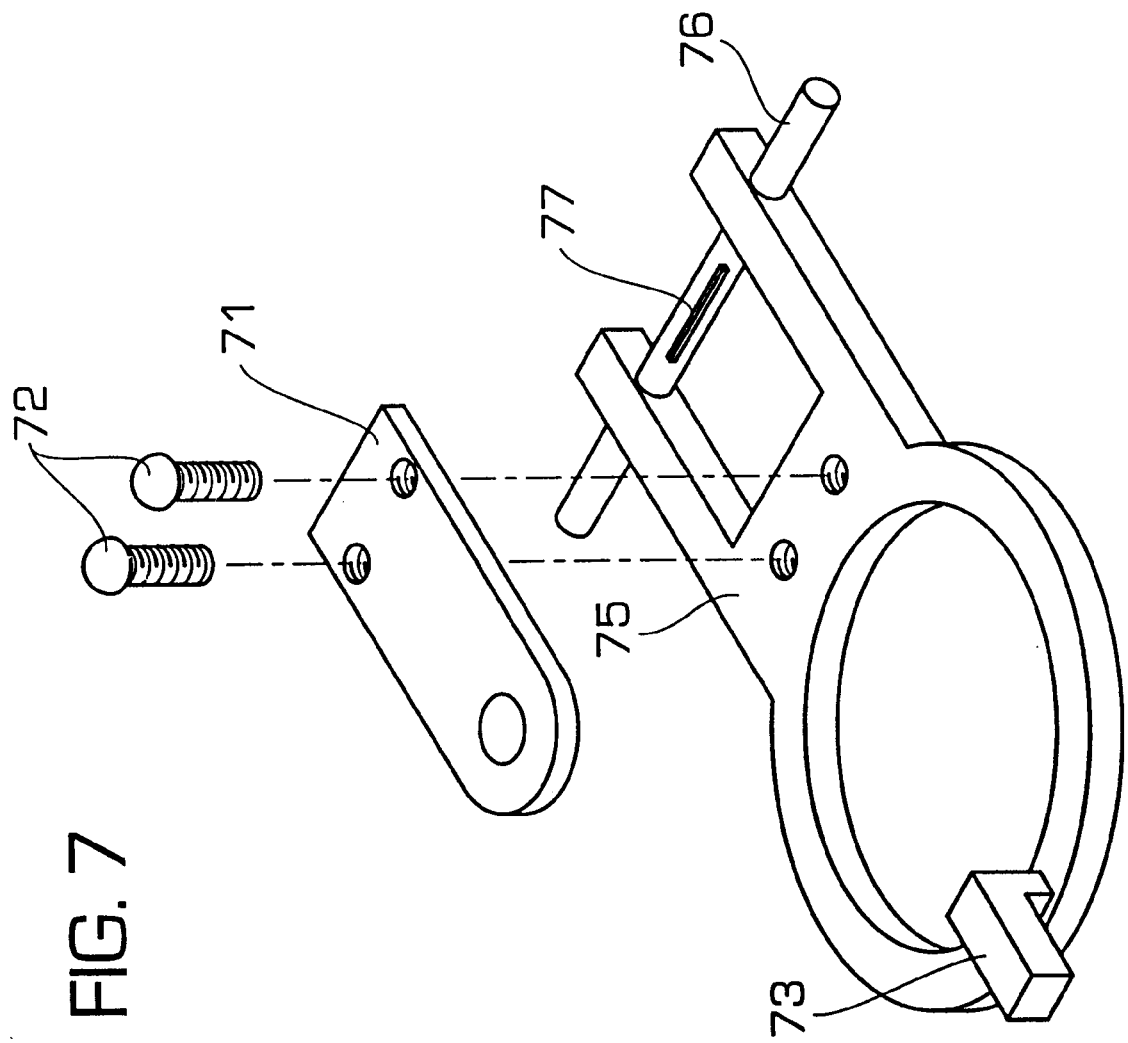
FIG. 7 is an exploded view of a clamp lever of an optical disc player according to another embodiment of the present invention.

FIG. 7 shows another embodiment of a clamp lever of an optical disc player according to the present invention. A shaft 76 is fixed to one end of a clamp lever 75, and a protrusion 77 is formed on the shaft 76. Instead of the clamp spring 41 which is formed in a body with the clamp lever 35 of the embodiment in FIG. 3, a leaf spring 71 is connected to the clamp lever 75 by screws 72. A protrusion (not shown) for pressing a central portion of the clamp (not shown) is also formed on the bottom surface of the leaf spring 71. A handle 73 for lifting clamp lever 75 is formed on the other end of the clamp lever 75.

Operation of the optical disc player according to the present invention will now be described. First, an initial position of the clamp lever 35 is shown in FIG. 4B wherein the clamp lever 35, during unloading of the tray 31, is lifted from the upper surface of the tray 31. Here, both the leaf spring 38 and the protrusion 37 of the shaft 36 operate to maintain the clamp lever 35 in inclined position. The optical disc D is placed on the tray 31 by a user, and then the tray 31 is loaded. As shown in FIG. 5, the pinion 46 rotates counterclockwise during loading and the rotating force is applied to the shaft 36 to rotate the clamp lever 35 toward the horizontal position parallel with the tray 31.

FIG. 4A shows the clamp lever 35 in the horizontal position parallel with the tray 31 and in contact with the optical disc D, which indicates the completion of loading. The leaf spring 38 is interlocked with the protrusion 37 of the shaft 36, to maintain the clamp lever 35 in the horizontal position. In this state, the spring 41 (or 71) presses the clamp 34.

While the clamp lever 35 is maintained in a horizontal position parallel with the tray 31, unloading is performed. As illustrated in FIG. 5, since the gear member 52 of the pinion 46 rotates clockwise to thereby press and deform the spring 55 and the rotating force is not applied to the shaft 36, the horizontal position of the clamp lever 35 can be maintained. Accordingly, even though unloading is completed by the tray 31 moving out of the housing 45, the clamp lever 35 remains in the horizontal position parallel with the tray 31 to hold the disc on the tray 31. The optical disc D can be removed from the player or exchanged with another disc after the clamp lever 35 is lifted by a user.

According to the optical disc player of the present invention, since the clamp fixed to the clamp lever presses the optical disc, it is possible to effectively clamp the optical disc regardless of its orientation. Also, since the clamp lever 35 is arranged on the tray 31, it is possible to compactly arrange components.

It should be understood that the invention is not limited to the illustrated embodiment and that many changes and modifications can be made within the scope of the invention as defined by the appended claims.

What is claimed is:

1. An optical disc player having a tray on which an optical disc is placed, means for driving said tray, clamping means for pressing said optical disc, and a housing for housing said tray therein, comprising:

a clamp lever pivotally hinge coupled to said tray, said clamping means being disposed on said clamp lever; and an elastic member for pressing said clamping means fixed to said clamp lever;

wherein said clamp lever is hinge coupled to said tray at one end of said clamp lever and said elastic member is coupled to the other end of said clamp lever;

a cylindrical shaft having a protrusion formed thereon, said cylindrical shaft being formed on said one end of said clamp lever for pivotally supporting said clamp lever; and an elastic plate member fixed to said tray and having a bent portion that is interlocked with said protrusion to bias said clamp lever toward two positions.

2. An optical disc player according to claim 1, wherein a bottom surface of said elastic member has a protrusion formed thereon at a position corresponding to a center of rotation of said clamping means for pressing said clamping means only in a downward direction.

3. An optical disc player according to claim 2, wherein said elastic member is a leaf spring fixed to said clamp lever.

4. An optical disc player according to claim 3, wherein said elastic member and said clamp lever are formed from one integral unitary structure.

5. An optical disc player according to claim 1, further comprising:

a pinion fixed to one end of said shaft for selectively rotating said shaft; and a rack fixed to one side of said housing, said rack being engaged with said pinion; and wherein said rack and pinion operate to rotate said cylindrical shaft and said protrusion in response to at least one of an opening and closing of said tray.

6. An optical disc player according to claim 5, wherein said pinion comprises:

a disc member fixed to said shaft;

a plurality of connecting protrusions and a first spring support formed on said disc member;

a gear member having a plurality of connecting through holes into which said plurality of connecting protrusions are inserted respectively, teeth for engaging said rack being formed on the outer circumference of said gear member;

a second spring support formed on said gear member; and a spring located between said first and second spring supports.

7. An optical disc player according to claim 6, wherein said pinion applies a rotational force to said cylindrical shaft and said protrusion only during the closing of said tray.

* * * * *

UNITED STATES PATENT AND TRADEMARK OFFICE
CERTIFICATE OF CORRECTION

PATENT NO.  : 6,046,975

DATED       : December 6, 1999

INVENTOR(S) : Young-Sun SEO

It is certified that error appears in the above-identified patent and that said Letters Patent is hereby corrected as shown below:

On the Title Page:

Item [54] delete "CLUMPING" and insert --CLAMPING--.

Signed and Sealed this

Third Day of April, 2001

*Attest:*

NICHOLAS P. GODICI

*Attesting Officer*   *Acting Director of the United States Patent and Trademark Office*